United States Patent
Sawyer

(10) Patent No.: US 7,230,825 B2
(45) Date of Patent: Jun. 12, 2007

(54) SPEAKER GRILL-AIR VENT COMBINATIONS FOR A PORTABLE COMPUTER

(75) Inventor: Michael D. Sawyer, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 10/785,566

(22) Filed: Feb. 24, 2004

(65) Prior Publication Data

US 2005/0185376 A1    Aug. 25, 2005

(51) Int. Cl.
*G06F 1/16*    (2006.01)
*G08B 21/00*   (2006.01)

(52) U.S. Cl. .................... 361/687; 381/337; 248/923; 340/573.1

(58) Field of Classification Search ......... 361/683.686, 361/724–727; 381/306, 337, 388, 165; 248/917–923; 364/708.1; 340/573.1
See application file for complete search history.

(56) References Cited

U.S. PATENT DOCUMENTS

| 5,224,024 | A | | 6/1993 | Tu et al. |
| 5,448,495 | A | | 9/1995 | Liu |
| 6,121,881 | A | * | 9/2000 | Bieback et al. .......... 340/573.1 |
| 6,430,300 | B1 | | 8/2002 | Cox et al. |
| 6,597,794 | B2 | * | 7/2003 | Cole et al. ................... 381/333 |
| 6,625,469 | B1 | * | 9/2003 | Hwang et al. ........... 455/550.1 |
| 6,671,171 | B1 | * | 12/2003 | Homer et al. ................ 361/683 |
| 2002/0057811 | A1 | * | 5/2002 | Burleson et al. ............ 381/165 |
| 2003/0005201 | A1 | * | 1/2003 | Olson et al. ................ 710/303 |
| 2003/0105892 | A1 | * | 6/2003 | Numano et al. .............. 710/14 |

FOREIGN PATENT DOCUMENTS

WO    WO 01/63968 A1    8/2001

* cited by examiner

*Primary Examiner*—Hung Van Duong
(74) *Attorney, Agent, or Firm*—Jeffrey A. Proehl; Woods Fuller Shultz & Smith

(57) ABSTRACT

A system comprising a portable computer chassis having an internal speaker; openings in the chassis from which sound from the speaker can emanate, wherein the openings allow heat generated by the system to escape is provided. In one embodiment, the internal speaker is located at least a minimum distance away from the openings. By utilizing speaker grills as ventilation openings in this manner, ventilation openings on the bottom side of notebook computers can be eliminated and user comfort can be increased when the system is placed on the lap. Additionally, system reliability is improved as ventilation is also increased.

29 Claims, 3 Drawing Sheets ved from the bottom of the unit. In this location, however, the vents are prone to blockage, particularly when users hold the unit on their lap, a cushion, stacks of papers, and the like. As a result, notebook computers can easily become overheated. Additionally, notebook computers are operating at increasingly high temperatures. For the user who places the unit on their lap, this can mean exposure to excessive heat through vents located on the bottom, which can be quite uncomfortable.

SPEAKER GRILL-AIR VENT COMBINATIONS FOR A PORTABLE COMPUTER

FIELD

The present invention relates generally to portable computers, and in particular, to speaker grill-air vent combinations for a portable computer.

BACKGROUND

Notebook computers need to have adequate ventilation in order to work properly. Because real estate is at a premium around the outside edges of notebook computers, many manufacturers are concentrating their ventilation openings onto the bottom of the unit. In this location, however, the vents are prone to blockage, particularly when users hold the unit on their lap, a cushion, stacks of papers, and the like. As a result, notebook computers can easily become overheated. Additionally, notebook computers are operating at increasingly high temperatures. For the user who places the unit on their lap, this can mean exposure to excessive heat through vents located on the bottom, which can be quite uncomfortable.

Thus, there is a need for providing improved mobile computer systems.

SUMMARY

A system comprising a portable computer chassis having an internal speaker; openings in the chassis from which sound from the speaker can emanate, wherein the openings allow heat generated by the system to escape is provided. In one embodiment, the internal speaker is located at least a minimum distance away from the openings to provide a suitable convection path to facilitate air flow.

In one embodiment there are two internal speakers and openings proximate to each speaker. In a particular embodiment, the openings are located on a front surface of the portable computer. In an alternative embodiment, the openings are located on a top surface of the portable computer or on one or more side surfaces of the portable computer. In one embodiment, the system further comprises separate air intake vents located on the chassis, such as on one or more side surfaces of the chassis. In one embodiment, the system further comprises one or more ventilation fans located between the air intake vents and heat cooling components located inside the chassis. In one embodiment the system further comprises one or more external speakers connectable to the chassis.

The present invention also provides a portable computer system comprising a portable computer chassis having an internal speaker; a heat generating device disposed within the chassis; a first opening in the chassis spaced apart from the internal speaker, wherein the opening facilitates emanation of sound outside the computer chassis, and wherein the first opening further facilitates flow of air between the internal speaker and the first opening; and a second opening in the chassis positioned to facilitate airflow between the second opening along a path past heat generated by the heat generating device within the chassis and the first opening to remove heat from within the computer chassis. In one embodiment, the first opening is positioned on the chassis to minimize interference with airflow during common use of the portable computer system. In one embodiment the first opening comprises a grill. In one embodiment, the portable computer system further comprises a third opening and further speaker positioned proximate the third opening to promote airflow between the third opening and further speaker.

The present invention also provides an electronic device comprising a notebook computer having a chassis and a lid, the chassis containing at least one surface-mounted speaker grill located at least a minimum distance away from an internal speaker. In one embodiment, sound from the internal speaker can emanate from the surface-mounted speaker grill and heated air from heat generating components in the portable computer can flow out of the surface-mounted speaker grill. In one embodiment, the surface-mounted speaker grill is on a front surface of the notebook computer. In one embodiment, there are two surface-mounted speaker grills on the front surface, wherein an internal speaker is located at least the minimum distance away from each surface-mounted speaker grill.

The invention further provides, in one embodiment, a method for ventilating a portable computer comprising providing a speaker grill on a surface of a portable computer within an airflow exhaust path; and venting heated air in the airflow exhaust path out through the speaker grill. In on embodiment, the speaker grill is not located on a bottom surface of the notebook computer. In one embodiment, the speaker grill is located on a front surface of the portable computer. In one embodiment, the speaker grill is located on a side surface or a top surface. In one embodiment, the method further comprises connecting an internal speaker to the portable computer at least a minimum distance away from the speaker grill. In one embodiment there are two speaker grills, each with a speaker located at least a minimum distance away. In one embodiment the method further comprises an airflow intake path wherein cool air is drawn in through one or more separate air intake vents and directed to heat cooling components. In one embodiment, the method further comprises providing a ventilation fan in the airflow intake path.

By utilizing speaker grills as ventilation covers in this manner, ventilation openings on the bottom side of notebook computers can be eliminated and user comfort can be increased when the system is placed on the lap. Additionally, system reliability is improved as ventilation is also increased.

DETAILED DESCRIPTION

In the following detailed description of embodiments of the invention, reference is made to the accompanying drawings that form a part hereof, and in which is shown by way of illustration specific exemplary embodiments in which the subject matter may be practiced. These embodiments are described in sufficient detail to enable those skilled in the art to practice them, and it is to be understood that other embodiments may be utilized and that mechanical, structural, electrical, and logical changes may be made without departing from the spirit and scope of the present subject matter. The following detailed description is, therefore, not to be taken in a limiting sense, and the scope of embodiments of the present invention is defined only by the appended claims.

Figure 1:
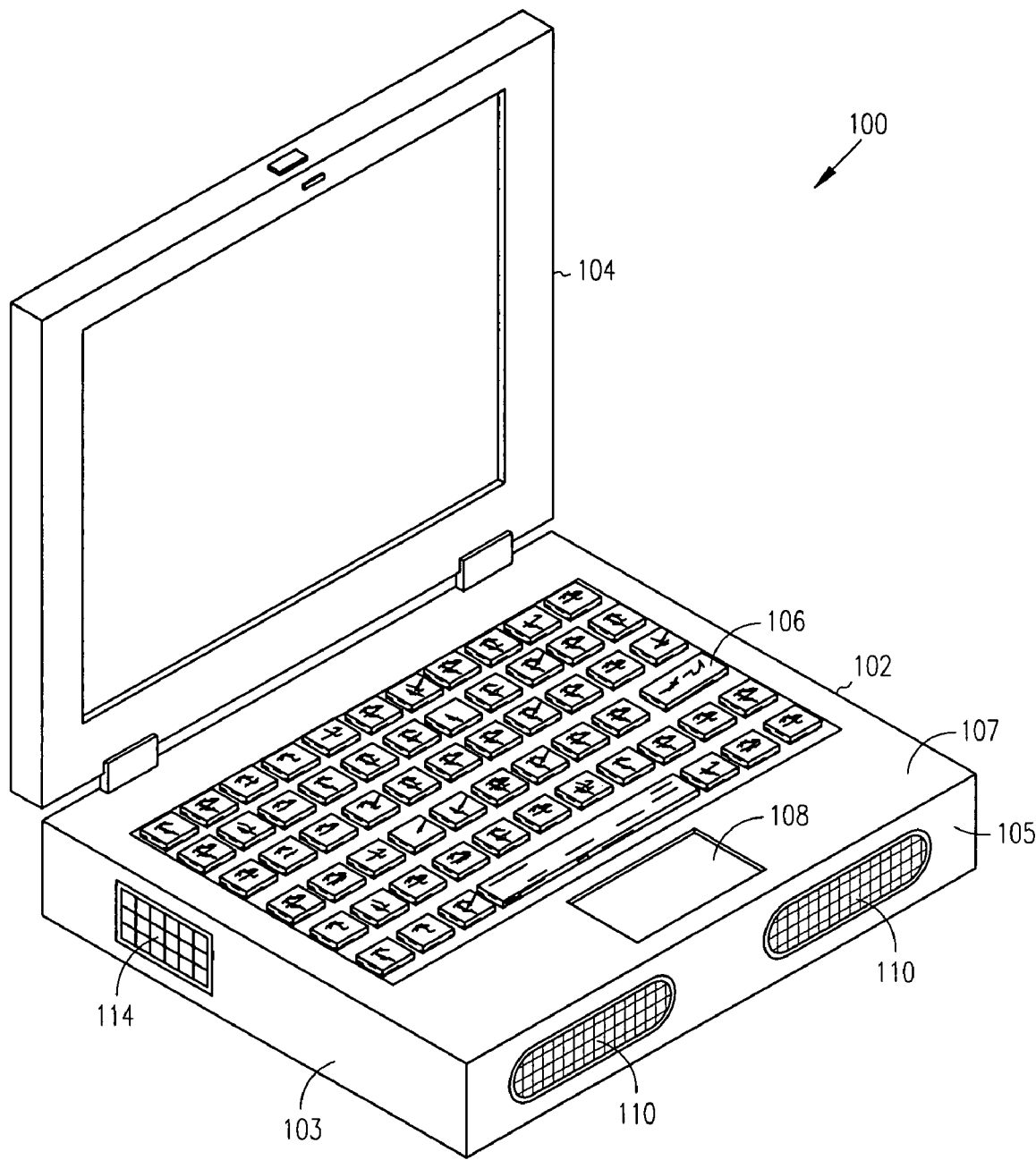
FIG. 1 is a simplified perspective view of a mobile computer containing speaker grill-air vent combinations in an embodiment of the present invention.

In the embodiment shown in FIG. 1, a mobile electronic device 100 is shown comprising a chassis 102 and a lid 104 in an open position. The chassis 102 has at least one side surface 103, a front surface 105 and a top surface 107. The chassis 102 can include, among other components, a keyboard 106 and a pointing device, such as a touchpad 108. Often included, but not shown, are a floppy drive, a hard disk drive, some version of a PCMCIA slot, an external power input port, and a battery. Other components are also present and the minimum types of components required to define a mobile electronic device 100, such as a portable computer, are well known in the art.

Two front speaker grill-air vents (i.e., speaker grill-exhaust vents) 110 and separate air intake openings 112 are also shown, although the invention is not so limited. Any number of speaker grill-air vents 110 can be used and placed in any desired location, including on the top surface, side surfaces and/or back surface of the chassis. Similarly, any number of air intake openings 112 can be used and placed in any desired location, including on the opposing side surface, back surface, top surface and/or front surface of the chassis. The speaker grill-air vents 110 and the air intake openings 112 are preferably substantially flush with the surface on which they are located.

Figure 2:
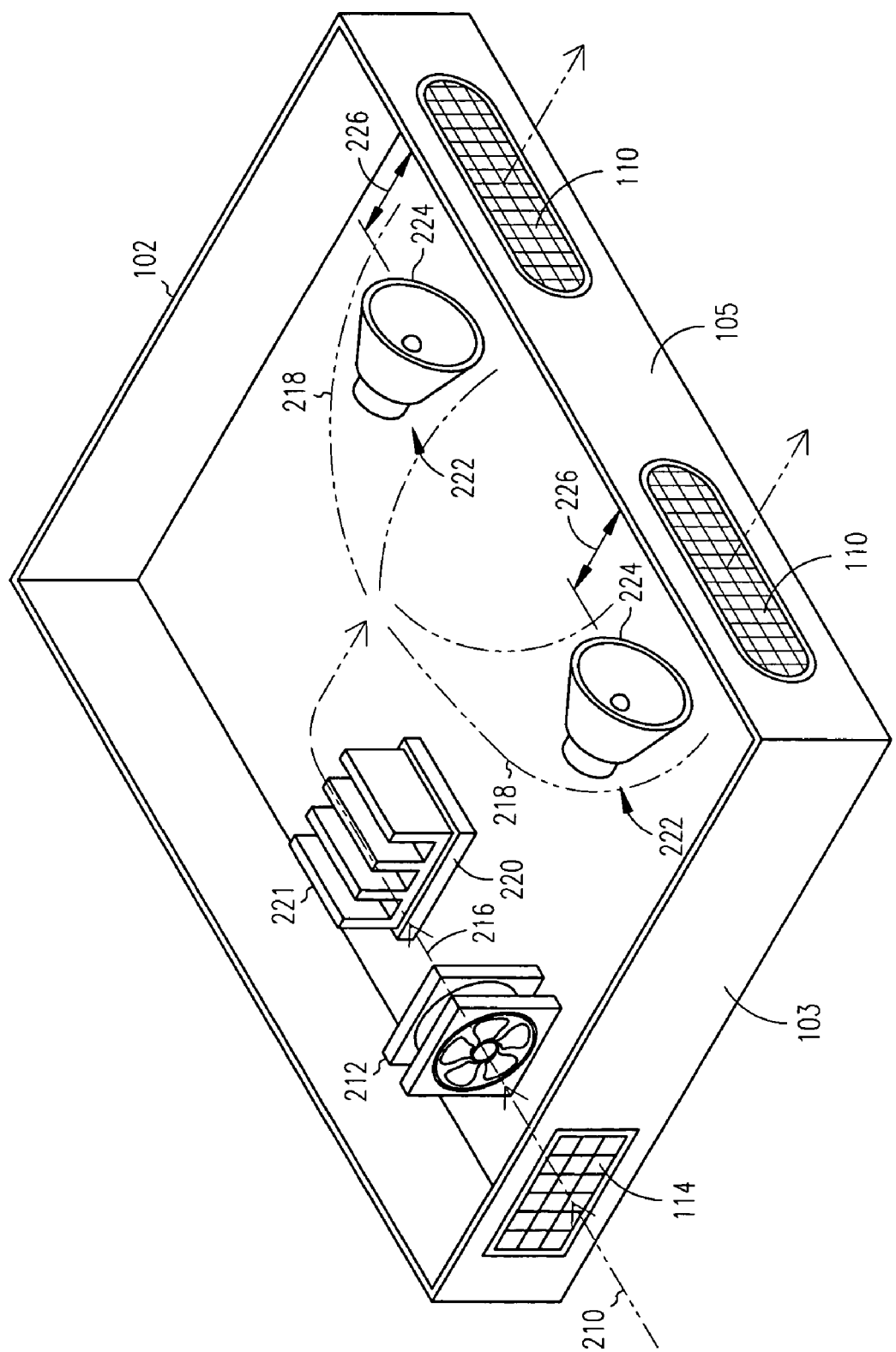
FIG. 2 is a simplified illustration showing airflow patterns in one embodiment of the present invention.

Placement of exhaust vents on a surface other than the bottom surface allows a user, for the first time, to comfortably and reliably use a portable device on their lap. By combining the exhaust vents with speaker grills, limited real estate within the device is used efficiently. The mobile electronic device 100 shown in FIG. 2 has a defined air path to divert airflow past the heat cooling components 221, such as a heat sink having fins, and out through the speaker grill-air vents 110. In this embodiment, cool air is drawn in through the air intake openings 114 as represented by line 210. The cool air is then drawn through a ventilation fan 212 and past the heat cooling components 221, as represented by line 216. The heat cooling components 221 take in heat from nearby heat generating components 220, such as a processor. As the cool air in line 216 flows over the heat cooling components 221 it becomes heated. The heated air is then exhausted out through the speaker grill-air vent openings 110 as represented by line 218. In one embodiment another ventilation fan 212 is used instead of or in addition to the ventilation fan 212 shown, to direct the flow of air away from heat generating components and out through the speaker grill-vent openings 110. In one embodiment, this second or alternative fan is located between the heat cooling components 221 and the speaker grill-air vent openings 110. In one embodiment a heat sink fan is used instead of or in addition to the one or more ventilation fans 212. In one embodiment, there are no fans. In other embodiments active cooling is achieved by means of refrigerative cooling including a cooling coil filled with any type of fluid as is known in the art. Additionally, the heat cooling components 221 can be arranged to encourage direct airflow between the air intake openings 114 and the speaker grill-air vents 110. For example, fins can be placed at an appropriate angle to enhance airflow.

Air intake openings 114 may be positioned wherever desired, resulting in airflow operating to cool any components which generate undesired heat. The preferred locations for the air intake openings 114 are dependent primarily on the location of the heat cooling components 221 and heat generating components 220. In some embodiments, the air intake openings 114 are centered along a surface. In other embodiments, the air intake openings 114 are offset to one side.

The individual air intake openings 114 can have any desired shape and size. In one embodiment, the air intake openings 114 comprise circular holes formed in the case, either as the case is molded, or after the case is formed, such as by drilling. In one embodiment, some or all of the openings 114 can be oval or elongated circles, which can provide for even greater airflow. In the embodiment shown in FIGS. 1 and 2, each opening has a substantially rectangular shape. In one embodiment there is at least one set of air intake openings 114 located near the bottom of the back side of the chassis 102. In this embodiment, at least some of the heat generating components 220 as well as the associated heat cooling components 221 are also located near the bottom of the chassis and more air is likely to be directed through the heat cooling components 221 if the air intake openings 114 are located nearby.

Similarly, the speaker grill-air vents 110 can be positioned wherever desired. However, the location of the speaker grill-air vents 110 impacts the placement of the air intake openings 114 which in turn impacts the location of the heat generating components 220 and heat cooling components 221 and any ventilation fans 212.

The individual openings in the speaker grill-air vents 110 can also be any suitable size and shape as long as proper ventilation is provided. In the embodiments shown in FIGS. 1 and 2, most of the individual openings have a substantially square shape although the invention is not so limited. In one embodiment, the openings in the speaker grill-air vents 110 comprise circular holes formed in the case, either as the case is molded, or after the case is formed, such as by drilling. In one embodiment, some or all of the openings 110 can be oval or elongated circles, which can provide for even greater airflow. Additionally, the overall shape of the speaker grill-air vent 110 can take on any suitable shape and dimension as needed to provide not only for proper ventilation but also for an optimized sound, as those skilled in the art understand. In the embodiment shown in FIGS. 1 and 2, the overall shape of each speaker grill-air vent 110 is substantially oval, although the invention is not so limited. In other embodiments, the speaker grill-air vents 110 can form any regular or irregular shape, such as a rectangle, square, and so forth.

The overall size of the speaker grill-air vents 110 will vary depending on the type of device, type and number of speakers, and so forth. It is also possible that additional exhaust or air vents can be utilized in addition to the one or more speaker grill-air vents 110 described herein. Generally, the types of openings can easily be modified by one of average skill in the art to many different shapes to obtain desired airflow characteristics.

Any type of sound system can be used with the unique speaker grill-air vents 110 described herein. In one embodiment, the sound system is a single speaker controlled as is known in the art. In other embodiment, the sound system comprises multiple stereo speakers with independent subwoofers controlled by a sound driver card added to a slot in the card rack of the computer. Although the basic speaker system is usually used only for error and messaging tones, it can be programmable to emit tone sequences, i.e. music or verbal messages, through the appropriate software. For most common multi-media computer configurations, a sound driver card and a pair of reasonable quality speakers are normally used. Air may also flow through selected portions of the speaker 222 in further embodiments.

Each individual speaker 222 can take on any number of configurations. In one embodiment, each speaker 222 is comprised of a speaker cone 224 coupled to the computer by a speaker control connection (not shown), usually wires. The particular design of the speaker housing can take on any configuration as long as the speaker grill can also serve as a ventilation opening, i.e., a speaker grill-air vent 110. Preferably, the quality of the sound emanating from the speaker grill-air vent 110 is not adversely affected by the heated air flowing out of the same opening.

Each speaker 222 can be located anywhere within the chassis 102 as long as a minimum distance 226 is maintained between the end of the cone 224 and the speaker grill-air vent 110. A minimum distance 226 is necessary to provide for adequate intake and output of cooling air and so that speaker performance is not adversely impacted. This minimum distance 226 may be a function of the amount of heat that needs to be conveyed outside the device 100. In one embodiment, the minimum distance 226 is 5 to 20 mm, but may vary outside of this range. The range may be varied to accommodate the amount of heat generated and the rate of air flow.

Those skilled in the art also understand that the overall quality of an internal sound system is affected by the location of the speakers 222 within the chassis 102 and the associated speaker grills. Although the speaker grill-air vents 110 can be located on any chassis surface, improved sound quality output is likely obtained when the speaker grill-air vents 110 are located on a surface other than the top surface, although the invention is not so limited. In some embodiments, such as for ultra-thin laptops, the top surface may be the preferred option (See FIG. 3). In other embodiments, additional speakers 222 can be placed at other locations known in the art, including on the display or at the display hinges. In one embodiment, additional retractable or pop-up speakers described in U.S. Pat. No. 5,838,537, assigned to Gateway, Inc., are used.

Figure 3:
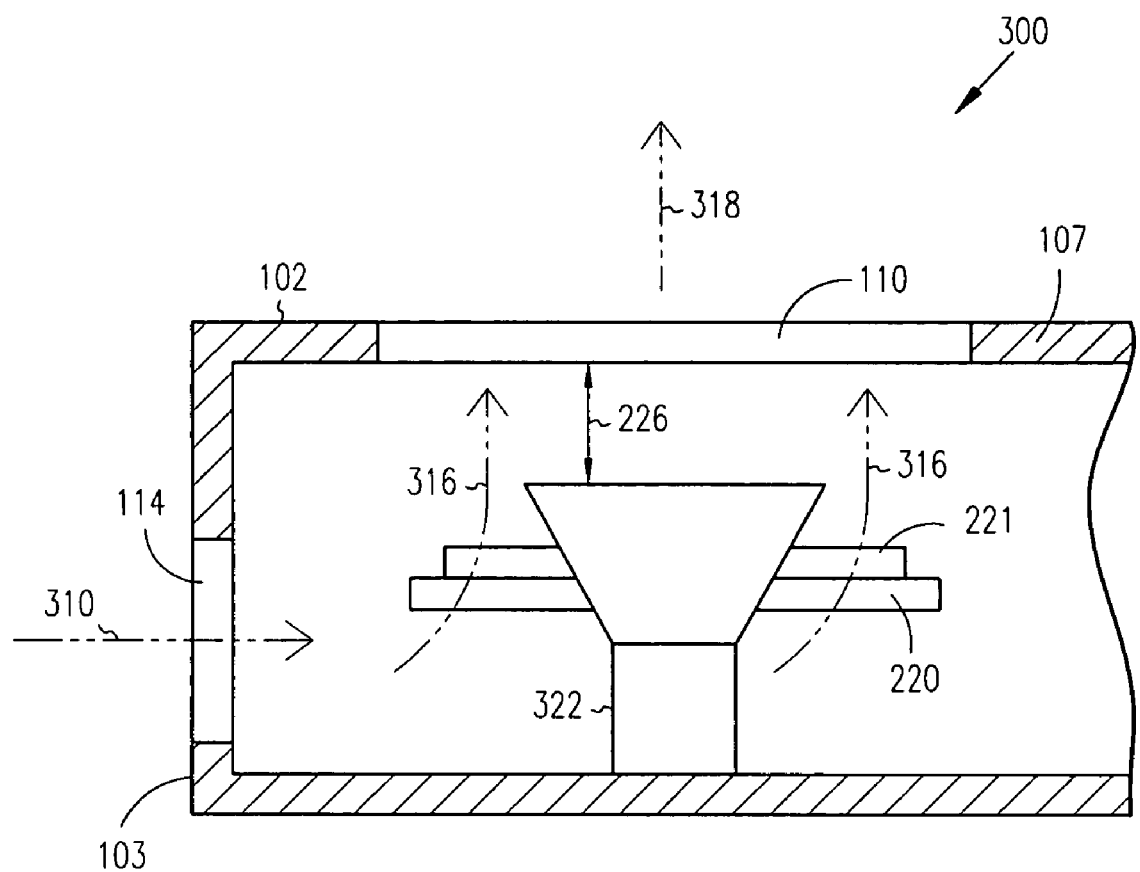
FIG. 3 is a cut-away partial view showing an alternative speaker and associated speaker grill-air vent in one embodiment of the present invention.

FIG. 3 shows an alternative device 300 in which the speaker 322 has a slightly different configuration and is also oriented in a substantially vertical position so that the speaker grill-air vent 310 is located on a top surface 107 of the chassis 102. In this embodiment, an air intake vent 114 is shown on a side surface 103 adjacent to the speaker 322. The device 300 shown in FIG. 3 has a defined air path to divert airflow past the heat cooling components 221, such as a heat sink having fins, and out through the speaker grills-air vents 310. In this embodiment, cool air is drawn in through the air intake openings 114 as represented by line 310. The cool air is then drawn past the heat cooling components 221, as represented by line 316. The heat cooling components 221 take in heat from heat generating components 220, such as a processor, located proximate to the heat cooling components 221. As the cool air in line 316 flows over the heat cooling components 221 it becomes heated. The heated air is then exhausted out through the speaker grill-air vent openings 110 as represented by line 318. In some embodiments, fans, as described above, can also be used to assist with the ventilation and cooling of the heat generating components 220.

The invention further comprises a method for ventilating a portable computer comprising providing a speaker grill on a surface of a portable computer within an airflow exhaust path; and venting heated air in the airflow exhaust path out through the speaker grill. In on embodiment, the speaker grill is not located on a bottom surface of the notebook computer. In one embodiment, the speaker grill is located on a front surface of the portable computer. In one embodiment, the speaker grill is located on a side surface or a top surface. In one embodiment, the method further comprises connecting an internal speaker to the portable computer at least a minimum distance away from the speaker grill. In one embodiment there are two speaker grills, each with a speaker located at least the minimum distance away. In one embodiment the method further comprises an airflow intake path wherein cool air is drawn in through one or more separate air intake vents and directed to heat cooling components. In one embodiment, the method further comprises providing a ventilation fan in the airflow intake path.

The present invention provides combination speaker grill-air vent openings by utilizing speaker grills as air vent covers, with a speaker positioned at least a minimum distance behind each speaker grill. This minimum distance allows for adequate intake and output of cooling air and does not adversely impact speaker performance. In one embodiment the minimum distance is about 5 to 20 mm. The novel combination speaker-ventilation design of the present invention can also be utilized on personal data assistants (PDAs), table personal computers, cellular phones and the like. By making the speaker grills perform multiple tasks, ventilation openings no longer need to be located on the bottom of the unit, making it operate more reliably.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A system comprising:
   a portable computer including a keyboard and a computer chassis defining an interior, the computer chassis containing at least one heat generating component in the interior and an internal speaker in the interior; and
   openings in a wall of the chassis from which sound produced by the speaker can emanate from the interior of the chassis;
   wherein the speaker is spaced from the wall of the chassis in which the openings are located to permit heat generated by the at least one heat generating component in the computer chassis to escape the interior of the computer chassis.

2. The system of claim 1 wherein the internal speaker is located at least a minimum distance away from the openings.

3. The system of claim 1 comprising two internal speakers and openings proximate to each speaker.

4. The method of claim 2 wherein said openings are located on at least one side surface of the portable computer.

5. The system of claim 1 wherein the speaker has a front from which sound generated by the speaker is emanated, and the openings in the wall of the chassis are positioned in front of the speaker.

6. The system of claim 1 wherein the speaker has an axis along which sound is directed from the speaker, the openings in the wall of the chassis being positioned adjacent to an intersection of the axis and the wall of the chassis.

7. The system of claim 1 wherein the speaker is configured in the computer chassis such that a flow of air moving through an interior of the computer chassis is capable of moving between the speaker and the openings in the chassis.

8. The system of claim 2 wherein the minimum distance is within the range of 5 to 20 mm.

9. The system of claim 2 wherein the openings are located on a top surface of the portable computer.

10. The system of claim 2 further comprising separate air intake vents located on the chassis.

11. The system of claim 3 wherein the openings are located on a front side surface of the portable computer.

12. The system of claim 3 further comprising one or more external speakers connectable to the chassis.

13. The system of claim 10 wherein the air intake vents are located on one or more side surfaces of the chassis.

14. The system of claim 10 further comprising one or more ventilation fans located between the air intake vents and heat cooling components located inside the chassis.

15. A portable computer system comprising:
a portable computer chassis having an internal speaker including a cone with a concave front;
a heat generating device disposed within the chassis;
a first opening in the chassis positioned in front of the internal speaker such that the first opening facilitates emanation of sound from the internal speaker to outside of the computer chassis, and wherein the front of the internal speaker is spaced from the first opening to facilitate airflow along a first path between the internal speaker and the first opening; and
a second opening in the chassis positioned to facilitate airflow between the second opening and the first opening along a further path past heat generated by the heat generating device within the computer chassis so as to remove heat generated by the heat generating device from within the computer chassis.

16. The portable computer system of claim 15 wherein the first opening is positioned on the chassis to minimize interference with airflow during common use of the portable computer system.

17. The portable computer system of claim 15 wherein the first opening comprises a grill.

18. The portable computer system of claim 15 and further comprising a third opening and a further speaker positioned proximate the third opening to promote airflow between the third opening and further speaker.

19. An electronic device comprising:
a notebook computer having a chassis and a lid, the chassis containing at least one surface-mounted speaker grill located at least a minimum distance away from an internal speaker, the internal speaker being located in said chassis such that sound from the internal speaker can emanate from the surface-mounted speaker grill and heated air from heat generating components in the portable computer can flow out of the surface-mounted speaker grill.

20. The electronic device of claim 19 wherein the surface-mounted speaker grill is on a front side surface of the notebook computer.

21. The electronic device of claim 20 further comprising a further surface-mounted speaker grill on the front side surface, and a further internal speaker located at least said minimum distance away from said further surface-mounted speaker grill.

22. A method of ventilating a portable computer comprising:
providing a speaker grill on a surface of a portable notebook computer, including a keyboard, in a position such that the grill is disposed within an airflow exhaust path for the computer;
spacing a front of a speaker away from the sneaker grill on the surface of the portable notebook computer so that the airflow exhaust path extends between the front of the speaker and the speaker grill; and
venting heated air in the airflow exhaust path out through the speaker grill.

23. The method of claim 22 wherein the speaker grill is not located on a bottom surface of the portable computer.

24. The method of claim 22 further comprising connecting an internal speaker to the portable computer at least a minimum distance away from the speaker grill.

25. The method of claim 22 comprising two speaker grills, each with a speaker located at least the minimum distance away.

26. The method of claim 22 further comprising an airflow intake path wherein cool air is drawn in through one or more separate air intake vents and directed to heat cooling components and wherein said airflow intake path leads to said airflow exhaust path.

27. The method of claim 23 wherein the speaker grill is on a front side surface of the portable computer.

28. The method of claim 23 wherein the speaker grill is on a side surface or top surface of the portable computer.

29. The method of claim 26 further comprising providing a ventilation fan in the airflow intake path.

* * * * *